US009903405B2

(12) United States Patent
Fujimoto et al.

(10) Patent No.: US 9,903,405 B2
(45) Date of Patent: Feb. 27, 2018

(54) BOLT

(71) Applicant: AOYAMA SEISAKUSHO CO., LTD., Niwa-Gun (JP)

(72) Inventors: Yukinori Fujimoto, Niwa-Gun (JP); Kazuoki Shibuya, Niwa-Gun (JP); Satoshi Iida, Niwa-Gun (JP); Naoki Inaba, Niwa-Gun (JP); Yuki Nishimura, Niwa-Gun (JP); Kazuhiro Koga, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 87 days.

(21) Appl. No.: 15/001,625

(22) Filed: Jan. 20, 2016

(65) Prior Publication Data
US 2016/0138639 A1 May 19, 2016

Related U.S. Application Data

(63) Continuation of application No. PCT/JP2013/076953, filed on Oct. 3, 2013.

(51) Int. Cl.
*F16B 35/00* (2006.01)
*F16B 25/00* (2006.01)
(Continued)

(52) U.S. Cl.
CPC ........ *F16B 35/007* (2013.01); *F16B 25/0021* (2013.01); *F16B 25/0052* (2013.01); *F16B 39/30* (2013.01); *F16B 2001/0064* (2013.01)

(58) Field of Classification Search
CPC .... F16B 39/30; F16B 35/007; F16B 25/0047; F16B 25/0052
(Continued)

(56) References Cited

U.S. PATENT DOCUMENTS 3,186,464 A * 6/1965 Baumle .................. B21H 3/027
411/168
3,426,642 A * 2/1969 Phipard, Jr. ......... F16B 25/0021
411/417
(Continued)

FOREIGN PATENT DOCUMENTS

CN 102227578 A 10/2011
JP 48-013900 5/1973
(Continued)

OTHER PUBLICATIONS

Japanese Office Action (With English Translation), Japanese Application No. 2015-540319, dated May 1, 2017 (10 pages).
(Continued)

*Primary Examiner* — Flemming Saether
(74) *Attorney, Agent, or Firm* — Burr & Brown, PLLC

(57) ABSTRACT

The bolt of the present invention can reliably peel coating even when fastened with a low torque, and can secure sufficient conductivity. A coating peeling part for peeling coating is formed at a tip end of an axis part in which a regular screw part is formed. The coating peeling part includes crushing parts having a trapezoidal top part and having a flank which is projected at a different angle with respect to the flank of the regular screw part; and a protruding part which is arranged adjacent to the crushing parts and whose top part projects beyond the outer diameter of the regular screw part.

3 Claims, 4 Drawing Sheets

(51) Int. Cl.
*F16B 39/30* (2006.01)
*F16B 35/02* (2006.01)
*F16B 1/00* (2006.01)

(58) Field of Classification Search
USPC .............................................. 411/386, 387.4
See application file for complete search history.

(56) References Cited

U.S. PATENT DOCUMENTS

| | | | | |
|---|---|---|---|---|
| 3,479,921 | A * | 11/1969 | Omoto | B21H 3/027 411/416 |
| 3,504,722 | A * | 4/1970 | Breed | B21H 3/025 411/168 |
| 3,527,136 | A * | 9/1970 | Wilson | F16B 25/0021 411/386 |
| 3,643,722 | A * | 2/1972 | Oestereicher | F16B 39/30 411/334 |
| 3,742,541 | A * | 7/1973 | Ohmoto | B23G 5/06 408/217 |
| 3,831,415 | A * | 8/1974 | Skierski | F16B 25/0052 72/469 |
| 5,385,439 | A * | 1/1995 | Hurdle | F16B 25/0052 411/311 |
| 6,347,917 | B1 | 2/2002 | Kato | |
| 8,322,960 | B2 * | 12/2012 | Gong | F16B 25/0026 411/387.5 |
| 8,864,430 | B2 * | 10/2014 | Su | F16B 25/0015 411/386 |

| | | |
|---|---|---|
| 2004/0184897 A1 | 9/2004 | Levey et al. |
| 2007/0264100 A1 | 11/2007 | Fujii et al. |
| 2008/0050200 A1 | 2/2008 | Su |
| 2009/0035091 A1 | 2/2009 | Geist et al. |
| 2011/0235193 A1 | 9/2011 | Yagi |
| 2014/0079510 A1 | 3/2014 | Suzuki et al. |
| 2014/0105705 A1 | 4/2014 | Hamano et al. |

FOREIGN PATENT DOCUMENTS

| | | |
|---|---|---|
| JP | 59-126108 A1 | 7/1984 |
| JP | 07-332337 A1 | 12/1995 |
| JP | 09-189319 A1 | 7/1997 |
| JP | 10-184637 A | 7/1998 |
| JP | 2001-234914 A | 8/2001 |
| JP | 3871483 B2 | 1/2007 |
| JP | 2009-036377 A1 | 2/2009 |
| JP | 2010-096199 A1 | 4/2010 |
| JP | 2011-179611 A1 | 9/2011 |
| WO | 2012/137831 A1 | 10/2012 |
| WO | 2012/160619 A1 | 11/2012 |

OTHER PUBLICATIONS

International Search Report (Application No. PCT/JP2013/076953) dated Jan. 7, 2014.
Chinese Office Action (Application No. 201380078750.4) dated Jan. 11, 2017.

* cited by examiner

Crushing part

Protruding part

BOLT

BACKGROUND OF THE INVENTION

Field of Invention

The present invention relates to a bolt that can secure conductivity with the nut even when fastened to a nut to which coating is applied.

Description of Related Art

In the production lines for automobiles and the like, bolts are used to attach various parts to a body to which coating treatment is applied. Especially in the case of attachment of a part which must secure conductivity with the body, a special bolt called an earth bolt is used. This bolt includes a coating peeling part which peels coating adhered onto the inner circumferential surface of a nut, and functions to peel coating for establishing metal touch between the bolt and the nut, thereby securing conductivity.

For example, Patent Literature 1 discloses an earth bolt designed in such a manner that a flank on the pressure side of a screw thread of the bolt is bent in the middle to dig the screw thread into a female screw, thereby bringing the screw threads into contact with each other. Also, Patent Literature 2 discloses an earth bolt in which a convex part having a flank angle which is approximately equal to the flank angle of a female screw is formed in a flank on the pressure side of a screw thread.

However, the bolt of Patent Literature 1 is intended to peel coating only by a tip end part of the screw thread, and thus coating cannot completely be peeled. Even if coating can be peeled, the peeled coating invades into a gap between the screw threads, thereby disadvantageously causing a conduction failure. Also, the bolt of Patent Literature 2 is intended to be fastened by digging the convex part formed in the flank on the pressure side of the screw thread and having a flank angle which is approximately equal to the flank angle of the female screw, into the nut, and thus disadvantageously requires a high fastening torque in order to secure conductivity.

CITATIONS LIST

Patent Literatures

Patent Literature 1: JP 2010-96199 A
Patent Literature 2: JP 3871483 A

SUMMARY OF INVENTION

Technical Problems

An object of the present invention is to provide a bolt which can solve the conventional problems as described above, can reliably peel coating even when fastened with a low torque, and can secure sufficient conductivity.

SOLUTIONS TO PROBLEMS

The bolt according to the first aspect of the present invention which has been made to solve the above problems is a bolt including a coating peeling part which is formed at a tip end of an axis part in which a regular screw part is formed. In this bolt, the coating peeling part includes: trapezoidal crushing parts having a flank which is projected at a different angle with respect to the flank of the regular screw part; and a protruding part which is arranged adjacent to the crushing parts and whose top part projects beyond the outer diameter of the regular screw part.

A second aspect of the present invention relates to the bolt according to the first aspect of the present invention in which the protruding part is formed between the crushing parts.

A third aspect of the present invention relates to the bolt according to the first aspect of the present invention in which the coating peeling parts are formed at a plurality of positions in the circumferential direction.

A fourth aspect of the present invention relates to the bolt according to the first aspect of the present invention in which a trapezoidal locking part having a flank which is projected with respect to the flank of the regular screw part is helically formed in the regular screw part on the bolt head part side than the coating peeling part.

ADVANTAGEOUS EFFECTS OF INVENTION

The bolt according to the first aspect of the present invention includes a coating peeling part which is formed at a tip end of an axis part, and the coating peeling part is designed to include: crushing parts having a trapezoidal top part and having a flank which is projected at a different angle with respect to the flank of the regular screw part; and a protruding part which is arranged adjacent to the crushing parts and whose top part projects beyond the outer diameter of the regular screw part. This enables peeling of the coating near the screw thread of a nut by the crushing part and further peeling of the coating near the valley bottom of the nut by the protruding part, thereby making it possible to completely remove coating. Also, this removed coating is designed to be discharged from a space part which is formed between the crushing part and the nut, thereby making it possible to suppress a conduction failure generated due to the remaining peeled coating. Further, the screw thread projected in the coating peeling part causes plastic flow within the nut, resulting in a smaller space part near the valley bottom of the nut. Therefore, the peeling of the coating by the protruding part is more securely occurs. In addition, since the regular screwing part is more firmly contacted with the nut at the time of completion of fastening, reliable coating peeling and high conductivity can be secured even when the bolt is fastened with a low torque.

According to the second aspect of the present invention, the protruding part is formed between the crushing parts so that the above-described coating peeling effect can be continuously provided when the bolt is screwed into the nut. Besides, a space between the protruding part and the crushing part can be utilized as a discharge route for the peeled coating film to smoothly discharge the coating film. According to the third aspect of the present invention, coating peeling can be conducted with good balance at a plurality of positions. According to the fourth aspect of the present invention, the trapezoidal locking part having a flank which is projected with respect to the flank of the regular screw part is helically formed in the regular screw part on the bolt head part side than the coating peeling part, so that the locking part can be reliably dug into the nut from which coating has been peeled by the coating peeling part, thereby securing more stable conductivity.

DETAILED DESCRIPTION OF THE INVENTION

Hereinafter, a preferred embodiment of the present invention is described.

Figure 1:
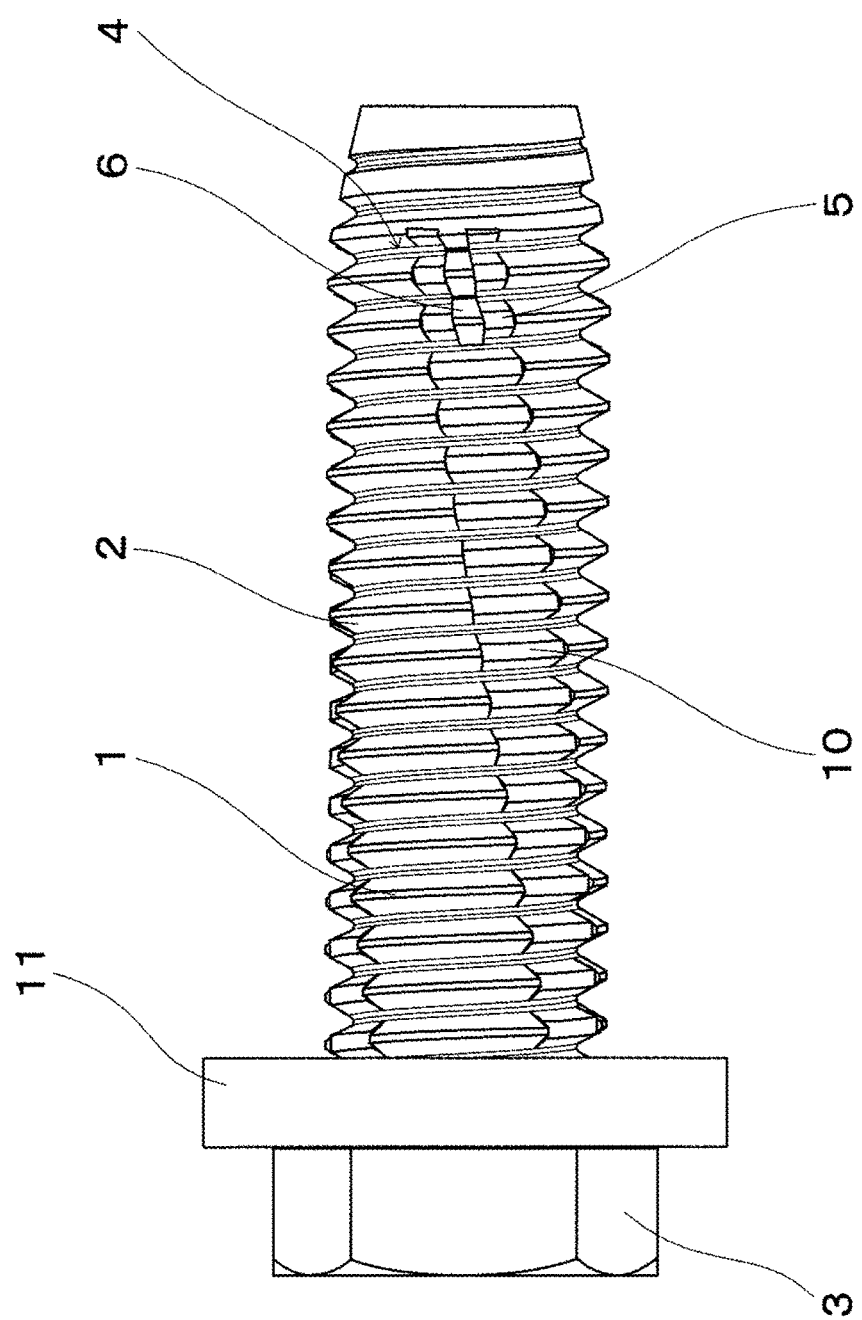
FIG. 1 is a front view showing an embodiment of the present invention.

As shown in FIG. 1, the bolt of the present embodiment includes a head part 3 in an upper end part of an axis part 2 in which a regular screw part 1 is formed. The length of the axis part 2 and shape of the head part 3 are arbitrarily determined, and the shape of the head part 3 is not necessarily limited to a hexagonal head part with a flange 11 as shown. In the present embodiment, the tip end of the axis part 2 serves as a tapered guide part in which an incomplete screw is formed. However, the shape of the guide part is not necessarily limited to a guide shape as shown. Also, the guide part may be omitted.

In the tip end part of this bolt, coating peeling parts 4 for peeling coating are formed at a plurality of positions in the circumferential direction. This coating peeling part 4 includes crushing parts 5 and a protruding part 6 which is formed adjacent to and between the crushing parts 5 and whose top part projects beyond the outer diameter of the regular screw part 1, as shown in FIG. 2.

Figure 3:
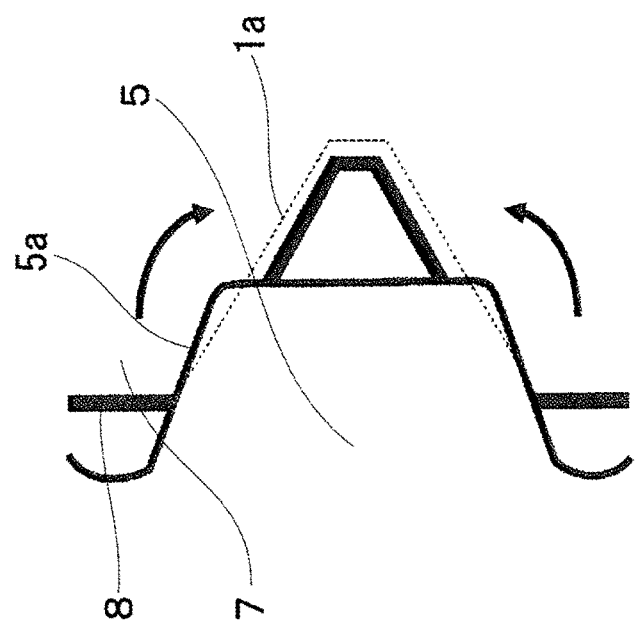
FIG. 3 is a cross sectional view showing a crushing part at the time of coating peeling.

The crushing part 5 crushes the tip end of the screw thread of the regular screw part 1 into a trapezoidal shape to cause plastic flow of a metal, and has a structure such that a flank 5a is projected at a greater angle relative to a flank 1a of the regular screw part 1 as shown in FIG. 3. This crushing part 5 is a part having the projected flank 5a by which the coating adhered to the screw thread of the nut is peeled.

Figure 2:
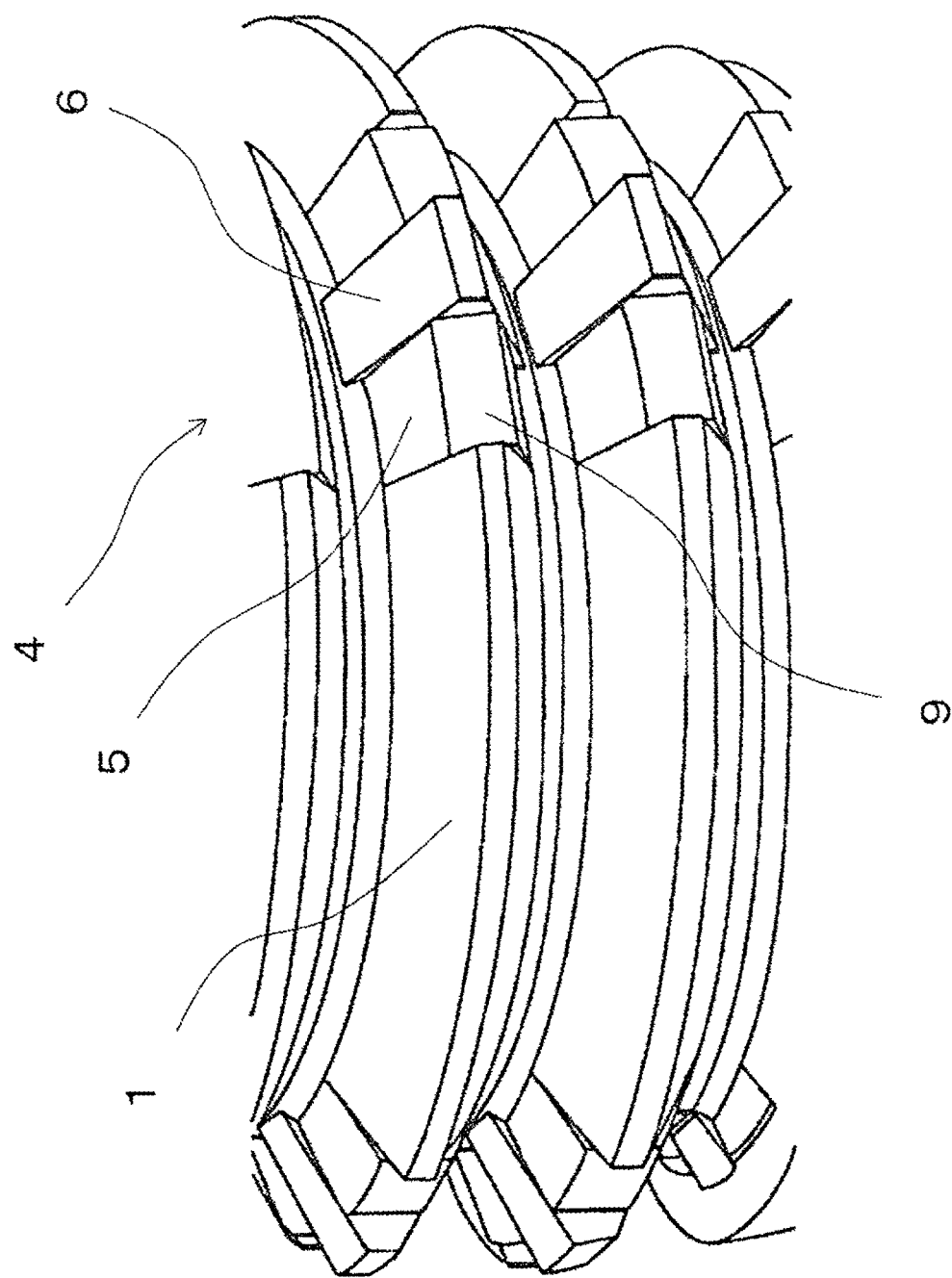
FIG. 2 is an enlarged perspective view of an essential part showing the embodiment of the present invention.
Figure 4:
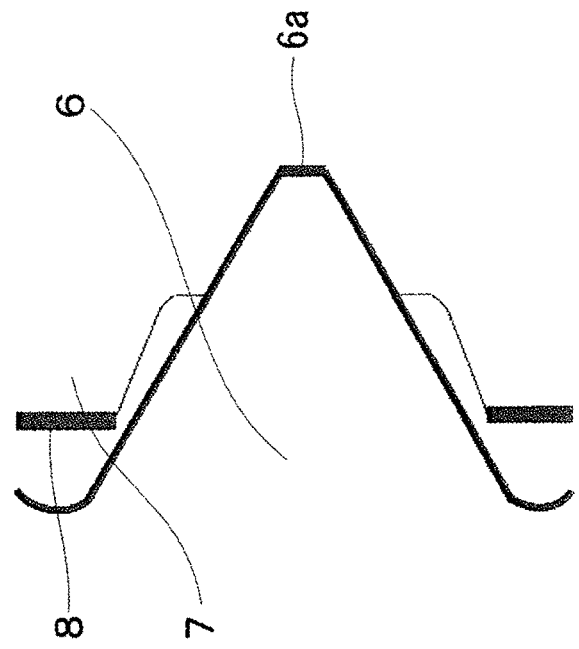
FIG. 4 is a cross sectional view showing a protruding part at the time of coating peeling.

The protruding part 6 is formed between the crushing parts 5 as shown in FIG. 2, and its top part 6a protrudes equally to or greater than the outer diameter of the regular screw part 1 as shown in FIG. 4. This protruding part 6 is a part which peels the coating adhered to the valley part of a female screw of the nut. In this embodiment, the width in the circumferential direction of the protruding part 6 is approximately equivalent to the width of the crushing parts 5 on both sides thereof. Since the crushing parts 5 having a smaller protruding amount than that of the protruding part 6 are provided on both sides of the protruding part 6, these crushing parts 5 function as coating discharge grooves.

Such coating peeling parts 4 including crushing parts 5 and a protruding part 6 are formed at three positions in the circumferential direction in this embodiment. Also, the coating peeling part 4 is helically formed over 2 to 3 pitches at the tip end of the axis part 2 as shown in FIG. 1. The coating peeling part 4 is a part which peels the coating adhered to the internal surface of the nut when the bolt is screwed into the nut, and thus is preferably provided at the tip end of the axis part 2, but the number thereof can be appropriately determined.

Figure 5:
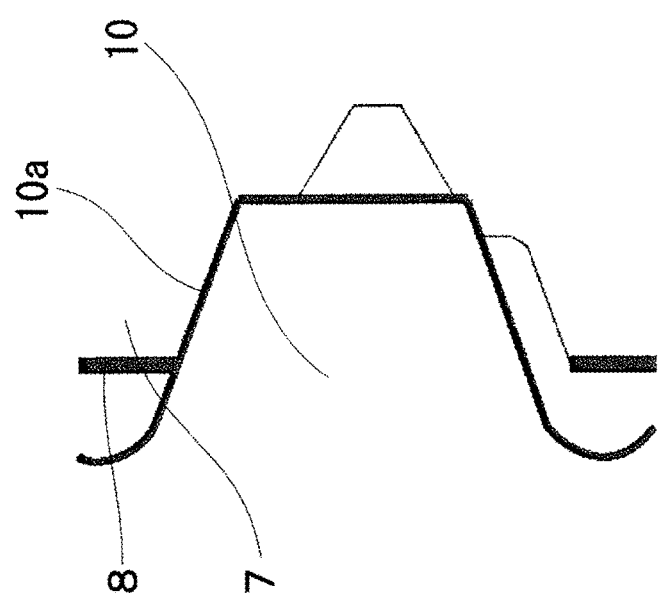
FIG. 5 is a cross section view showing a locking part at the time of completion of fastening.

As shown in FIG. 1, in the present embodiment, a locking part 10 is helically formed in the regular screw part 1 on the head part 3 side than this coating peeling part 4. This locking part 10 is also a part obtained by crushing the tip end of the screw thread of the regular screw part 1 into a trapezoidal shape as shown in FIG. 5, but provides a smaller crushing amount than that of the above-described crushing part 5. A flank 10a of the locking part 10 is in a slightly more projected shape than the flank 1a of the regular screw part 1. As shown in FIG. 1, the width in the circumferential direction of the locking part 10 is identical with the width in the circumferential direction of the coating peeling part 4 in this embodiment, but is not limited to this. The locking part 10 is helically formed in order to facilitate rolling by use of a die. Incidentally, the locking part 10 is not an essential requirement for the present invention, and can also be omitted.

When the bolt formed in the above-described manner is screwed into the coated nut, the crushing part 5 of the coating peeling part 4 formed at the tip end of the axis part 2 is firstly brought into contact with the screw thread of the nut. As described above, the flank 5a of the crushing part 5 projects at a different angle with respect to the flank 1a of the regular screw part 1, so that the coating 8 near the screw thread of the nut 7 is peeled and also that a part on the tip end side than the center of the screw thread is forced to spread as shown in FIG. 3. Therefore, plastic flow of a metal occurs in a direction indicated by an arrow so that a space part near the valley bottom of the nut 7 reduces.

Next, the coating 8 near the valley bottom of the nut 7 is peeled by the protruding part 6 arranged adjacent to the crushing part 5 as shown in FIG. 4. The top part 6a of the protruding part 6 protrudes equally to or greater than the outer diameter of the regular screw part 1, as described above. Besides, the space part near the valley bottom of the nut 7 is narrowed by plastic flow. Thus, the coating 8 near the valley bottom of the nut 7 is completely peeled.

This removed coating 8 would be discharged from the space part 9 which is a groove formed between the crushing part 5 and the nut as shown in FIG. 2, and the peeled coating 8 does not remain between the bolt and the nut, thereby making it possible to suppress a conduction failure.

When coating is peeled by the coating peeling part 4 at the tip end of the axis part 2 in this manner and then the bolt is further screwed into the nut, the regular screw part 1 passes through the valley part of the screw of the nut 7, and the locking part 10 also passes through the valley part of the screw of the nut 7. However, at the time of completion of fastening, the locking part 10 strongly digs into the pressure side of the screw of the nut 7, as shown in FIG. 5, by the axial force generated between the bolt and the nut, and the regular screw part 1 also strongly digs into the pressure side of the screw of the nut 7, thereby securing conductivity between the bolt and the nut 7.

Thus, the bolt of the present invention allows the coating peeling part 4 to conduct coating peeling and plastic deformation near the valley bottom of the nut 7, and, thereafter, allows the screw thread of the bolt to dig into the screw thread of the nut 7 by the axial force, and thus provides the advantages that coating can be reliably peeled even when fastened with a low torque as compared with conventional products, thereby securing sufficient conductivity.

REFERENCE SIGNS LIST

1. Regular screw part
1a. Flank
2. Axis part
3. Hexagonal head part
4. Coating peeling part
5. Crushing part
6. Protruding part
7. Nut
8. Coating
9. Space part 10. Locking part
10a, Flank
11. Flange part

The invention claimed is:

1. A bolt comprising a coating peeling part which is formed at a tip end of an axis part in which a regular screw thread is formed, wherein the coating peeling part comprises: trapezoidal crushing parts having a flank which is projected at a different angle with respect to the flank of the regular screw thread; a regular screw thread portion having the regular screw thread; and a protruding part which is arranged adjacent to the crushing parts and the protruding part having a top part that projects beyond the outer diameter of a thread crest of the regular screw thread, wherein the protruding part is formed between the crushing parts and the regular screw thread portion is arranged between respectively adjacent crushing parts, with the crushing parts each having a crest that protrudes outward to a smaller amount than that of the thread crest of the regular screw thread in the regular screw thread portion and the top part of the protruding part.

2. The bolt according to claim 1, wherein the coating peeling parts are formed at a plurality of positions in the circumferential direction.

3. The bolt according to claim 1, wherein a trapezoidal locking part having a flank which is projected with respect to the flank of the regular screw thread is helically formed in the regular screw thread on a bolt head part side apart from the coating peeling part.

* * * * *